UNITED STATES PATENT OFFICE.

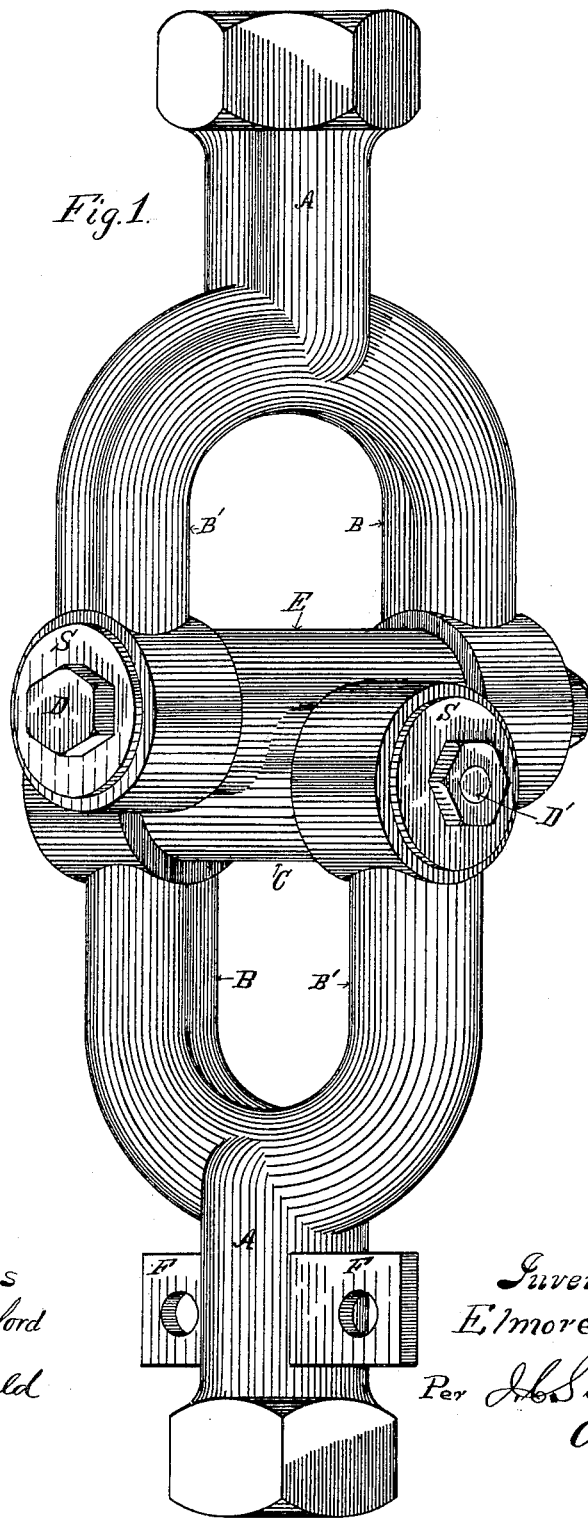

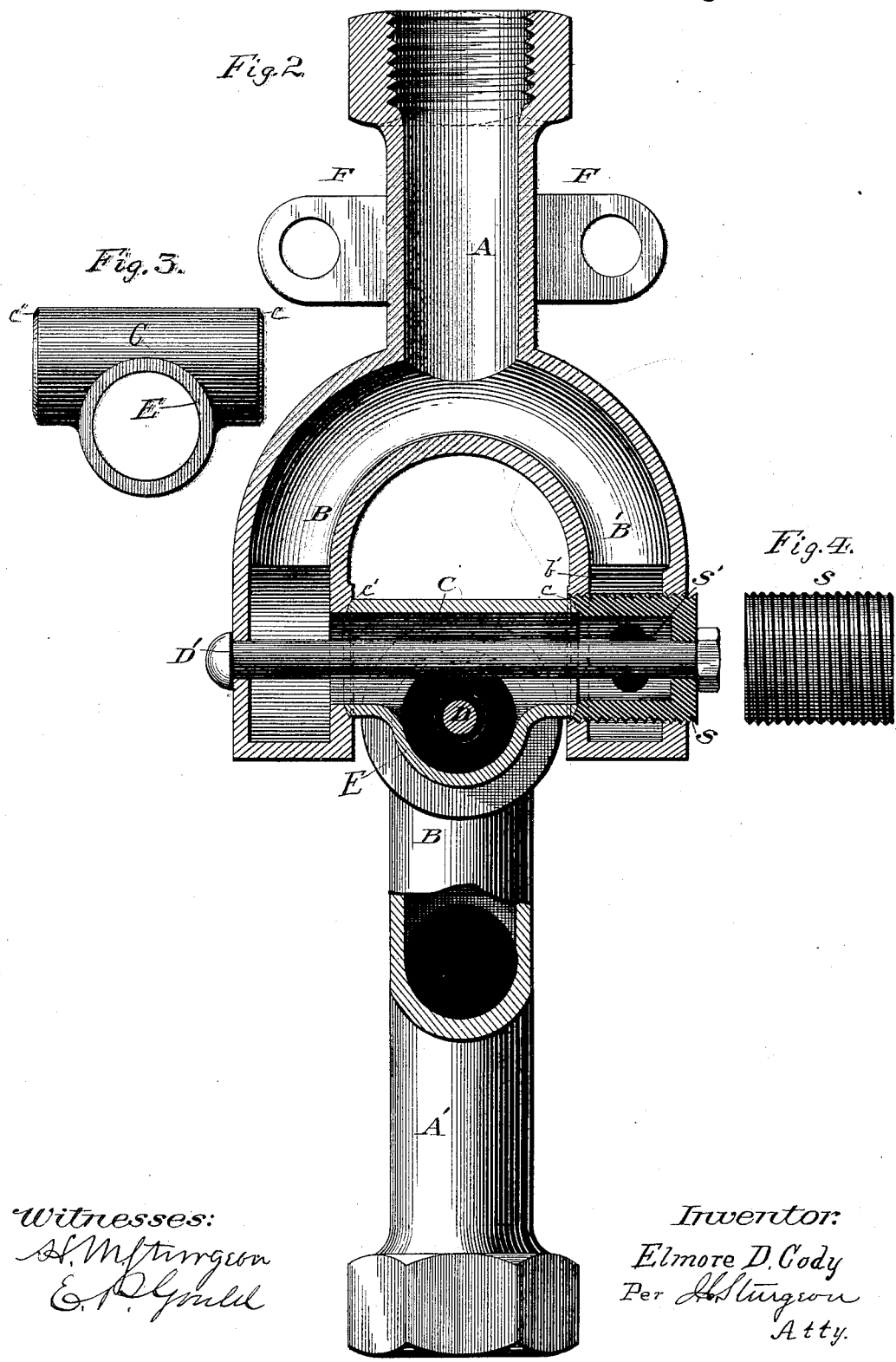

ELMORE DAVID CODY, OF DUNKIRK, NEW YORK.

UNIVERSAL JOINT FOR STEAM, WATER, AND OTHER LIQUID PIPES.

SPECIFICATION forming part of Letters Patent No. 325,056, dated August 25, 1885.

Application filed April 2, 1884. (No model.)

*To all whom it may concern:*

Be it known that I, ELMORE DAVID CODY, a citizen of the United States, residing at the city of Dunkirk, in the county of Chautauqua and State of New York, have invented certain new and useful Improvements in Universal Joints for Steam, Water, and other Liquid Pipes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in universal pipe-joints in which the joint is formed of U-shaped ends attached to the pipe-sections, and connected together, by means of short crossed pipes, in such relation to each other that one of the sections moves freely upon the other horizontally or vertically without interfering with the free passage of steam, fluid, air, or gas being conveyed through such joint and the pipes connected thereby; and it consists, chiefly, in providing in the arms of such joint means for readily adjusting the same to take up wear therein.

Other features of my invention will appear more fully in the specification and claims. I attain these objects by the mechanism illustrated in the accompanying drawings, in which—

Figure 1 is a perspective view of my improved universal pipe-joint. Fig. 2 is a horizontal section of my improved joint, through the center thereof, with a portion of the pipe in perspective. Fig. 3 is a plain horizontal view of the short crossed pipes used to connect the sections of the joint together. Fig. 4 is a plain horizontal view of a screw-plug used to secure the parts of the joint in place.

Similar letters refer to like parts in all the figures.

In the view shown in Figs. 1 and 2, A represents one of the sections of the pipe, and A' the other. Upon the section A, I construct the U-shaped arms B B', one arm of which, B', is provided with a hollow screw cap or plug, S, which extends through the arm B', from the outside thereof, a screw-thread being cut in the arm B' therefor. The outer end of the screw-plug S is closed, excepting a bolt-hole therein, and the inner end open. This screw-plug S is also provided with openings, S', which communicate with the opening in the arm B', by means of the chamber b', through which it passes. The inner end of the screw-plug S, also opens directly into the end c, of one arm of the short crossed pipes C E. The ends c c' of the crossed pipe C are turned with a bevel, and the bearings therefor in the arm B and inner end of the screw plug S are bored out with a bevel adapted to fit the ends c c' on the crossed pipe C. These joints are then ground together, so that the crossed pipe C being placed between the arms B B', by screwing up the plugs S, steam or fluid tight joints are formed between the ends of the crossed pipe C and the arm B and screw-plug S. To further secure the parts in place, I then place a bolt, D', through the end of the arm B, the crossed pipe C, and screw-plug S, thus preventing any loosening of the joint by the springing apart of the arms B B' or the wearing of the parts.

In Fig. 3 the crossed pipes C E are shown detached, and it will be seen that the pipes C and E cross each other at right angles and offset about one-half of the diameter of each, so that the bolts D D' will pass each other without interfering.

The section of the pipe A' is likewise constructed with U-shaped arms, in all respects like the section A, hereinbefore described, and is fitted to the cross-pipe E in the same manner as the arms B B' of the section A are fitted to the cross-pipe C, and in like manner secured in place by a bolt D. (Shown in section in Fig. 1.)

It will readily be seen that steam, gas, or fluid passing into the section A of the pipe will pass around through the arms B and B' thereof into the cross-pipe C, and from thence through the cross-pipe E into the arms B and B', and thence through the section A', at whatever angle the pipes A and A' may be placed to each other, and vice versa, in the opposite direction; and also that the mechanism herein described admits of the speedy adjustment of the parts of the joint to provide for any wear therein.

The flanges F F on sections A are for the purpose of securing this section in place, and may be dispensed with, if desired.

I am aware that universal joints have been heretofore constructed of hollow arms connected by short crossed pipes, the patent of Holland of July 1, 1879, being of this form; but I am not aware of any such joint having been heretofore constructed provided with means for adequately taking up the wear thereof as I do.

I am also aware that bolts have been heretofore employed for securing the parts of a joint composed of a T, placed between U-shaped arms, the patent of Holland of March 28, 1882, being of this character; but I am not aware of any gimbal or universal pipe-joint having been so constructed as to admit of the use of bolts for securing both sections of the joint together. This I accomplish by offsetting the crossed pipes C and E, so as to permit the bolts D D' to pass without interfering with each other. I do not therefore broadly claim a gimbal or universal joint composed of U-shaped sections connected by crossed pipes.

Having thus fully described my improvement, so as to enable those skilled in the art to which it appertains to construct and operate the same, what I do claim as new, and desire to secure by Letters Patent of the United States, is—

The combination, in a universal or gimbal pipe-joint, of the U-shaped section, B B' and B B', with the offset crossed pipes C E, the adjustable screw-plugs S S, and the two pivoted bolts D D', substantially as and for the purpose set forth.

ELMORE DAVID CODY.

Witnesses.
   F. M. DRIGGS.
   F. S. EDWARDS.